(12) United States Patent
Song

(10) Patent No.: US 6,890,281 B2
(45) Date of Patent: May 10, 2005

(54) SPEED REDUCTION DEVICE FOR PREVENTING ROTATIONAL BACK-RUSH

(76) Inventor: Chong Song, 8/1, 479-8 Giryoung-ri, Jangan-eup, Gijang-gun, 619-951, Busan (KR)

( * ) Notice: Subject to any disclaimer, the term of this patent is extended or adjusted under 35 U.S.C. 154(b) by 12 days.

(21) Appl. No.: 10/868,711

(22) Filed: Jun. 15, 2004

(65) Prior Publication Data

US 2004/0224810 A1 Nov. 11, 2004

Related U.S. Application Data

(63) Continuation of application No. PCT/KR02/02415, filed on Dec. 20, 2002.

(30) Foreign Application Priority Data

Dec. 21, 2001 (KR) ............................ 2001-0039739

(51) Int. Cl.[7] .............................................. F16H 3/70

(52) U.S. Cl. ...................................... 475/170; 475/165

(58) Field of Search ................................ 475/163, 165, 475/170, 172; 74/640, 390, 393, 409

(56) References Cited

U.S. PATENT DOCUMENTS

| | | | | |
|---|---|---|---|---|
| 2,286,236 A | * | 6/1942 | Hoyt | 123/406.11 |
| 3,184,995 A | * | 5/1965 | Smith | 475/254 |
| 3,596,538 A | * | 8/1971 | Braun | 475/342 |
| 6,014,907 A | * | 1/2000 | Rilbe | 74/395 |
| 6,530,175 B2 | * | 3/2003 | Sato et al. | 49/138 |

FOREIGN PATENT DOCUMENTS

JP 2000074161 A * 3/2000

* cited by examiner

Primary Examiner—Tisha Lewis
(74) Attorney, Agent, or Firm—St. Onge Steward Johnston & Reens LLC

(57) ABSTRACT

The present invention relates to a speed reduction device for preventing a rotational back-rush that includes: a rotary plate provided at the inside of a square casing; an external gear disposed in eccentrically tooth-coupling relation with the internal gear; operational grooves disposed at right and acute angles to the internal gear and the output shaft, at the outside of the rotary plate; eccentric shafts provided in the operational grooves to correspond to the eccentric quantity; an input shaft extended from any one of the eccentric shafts to the outside of the square casing; and eccentric parts provided in the eccentric shafts, the eccentric part for guiding the rotary plate when the eccentric part pushes the rotary plate.

2 Claims, 4 Drawing Sheets

SPEED REDUCTION DEVICE FOR PREVENTING ROTATIONAL BACK-RUSH

This application is a continuation of pending International Patent Application No. PCT/KR02/02415 filed Dec. 20, 2002 which designates the United States and claims priority of pending Korea Patent Application No. 2001-39739 filed Dec. 21, 2001.

BACKGROUND OF THE INVENTION

1. Technical Field

The present invention relates to a speed reduction device for preventing a rotational back-rush that is used at present in variety of fields, and more particularly, to a speed reduction device having a high reduction ratio that is capable of being configured in a simple manner, producing input and output at the state of being crossed to each other at a predetermined angle, and preventing a rotational back-rush.

2. Background Art

Generally, development for a speed reduction device that can prevent a rotational back-rush is made in various ways, and such a speed reduction device has been already put into practical use in variety of industrial fields.

However, conventional speed reduction devices are formed in such a manner that in a state where an external gear is engaged with an internal gear, an input shaft is disposed in parallel relation with an output shaft or on the same shaft as the output shaft. Also, they have a complicated configuration where a plurality of spur gears are provided. On the other hand, in the case where the input shaft is disposed perpendicularly to the output shaft, they should need a separate bevel gear or worm gear as a power transmitting gear.

DISCLOSURE OF INVENTION

To solve the above-described problems, it is an object of the present invention to provide a speed reduction device for preventing a rotational back-rush of the conventional art that includes input and output shafts disposed perpendicularly to each other, without having any separate bevel gear.

To accomplish this and other objects of the present invention, there is provided a speed reduction device having a high reduction ratio that prevents a rotational back-rush, which is configured in such a simple way that eccentric shafts are disposed perpendicularly to each other at the outside of a rotary plate with an internal gear formed in the inside thereof and are in tooth-coupling relation with bevel gears on the end portions thereof, thereby making the rotary plate turned by the eccentric force applied from the eccentric shafts.

BRIEF DESCRIPTION OF THE DRAWINGS

Further objects and advantages of the invention can be more fully understood from the following detailed description taken in conjunction with the accompanying drawings, in which.

DETAILED DESCRIPTION OF EMBODIMENTS

Now, an explanation of the preferred embodiment of the present invention will be given with reference to accompanying drawings.

Figure 1:
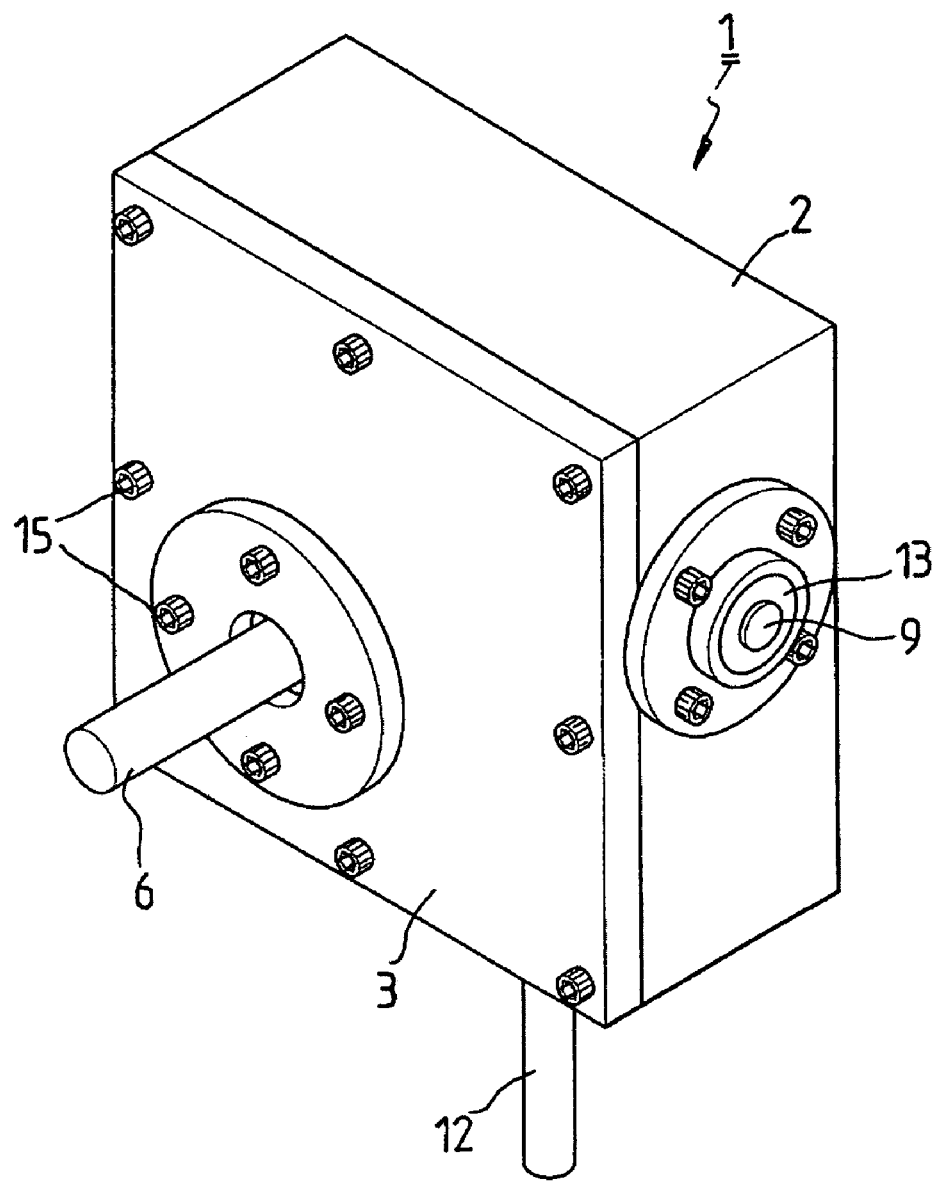
FIG. 1 is a perspective view of a speed reduction device according to the present invention.
Figure 2:
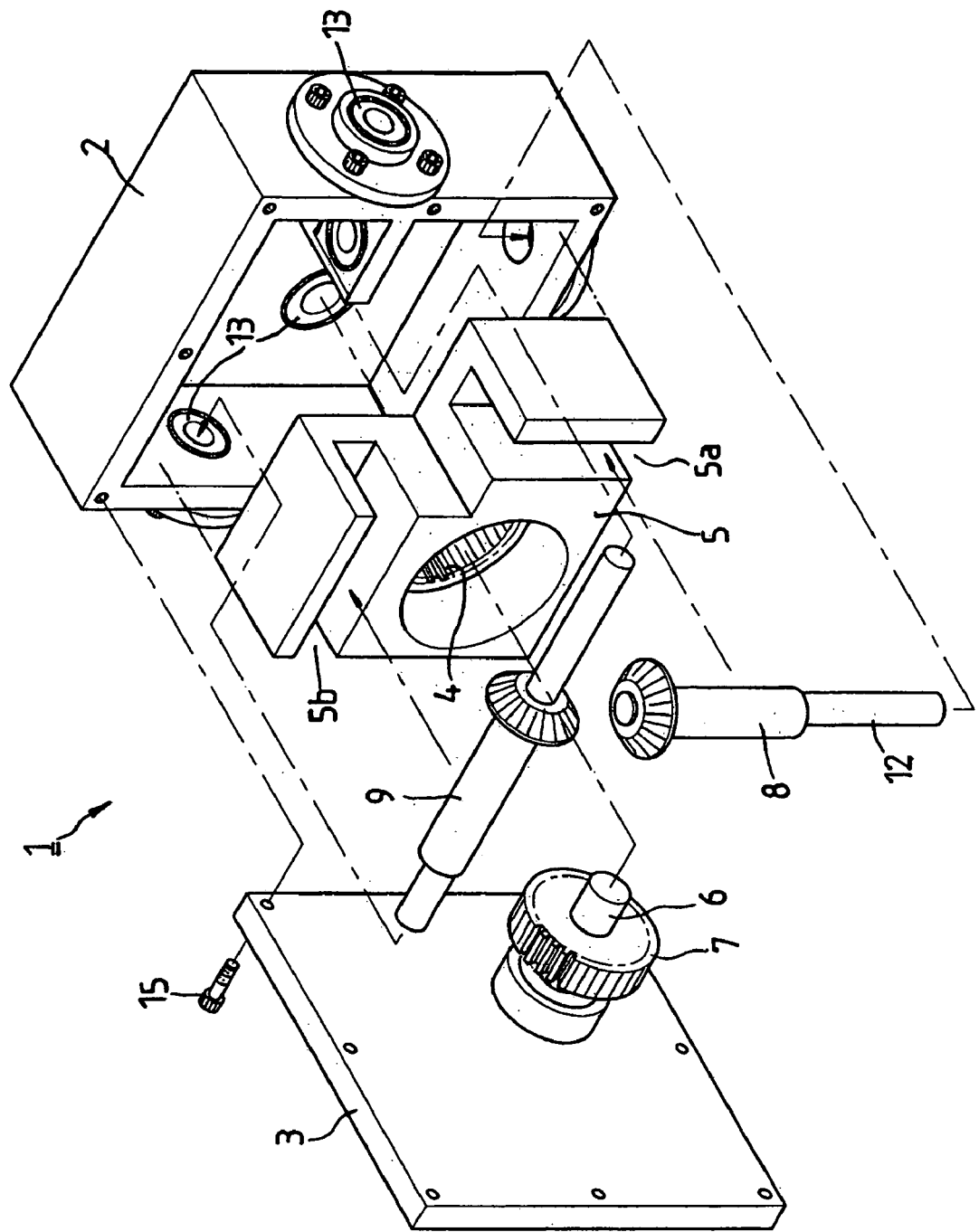
FIG. 2 is an exploded perspective view of the speed reduction device.
Figure 3:
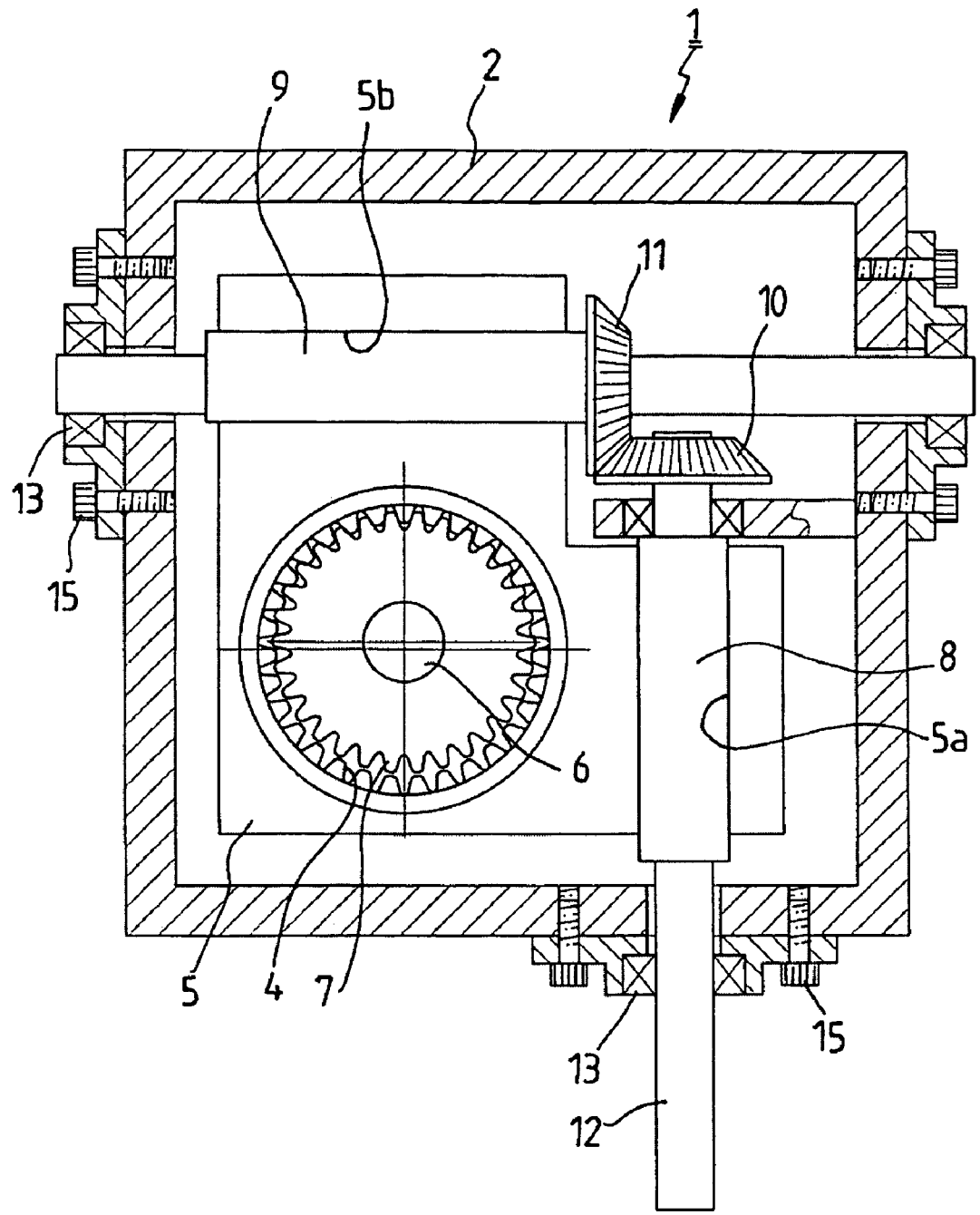
FIG. 3 is a front sectional view showing the coupled state of the speed reduction device.
Figure 4:
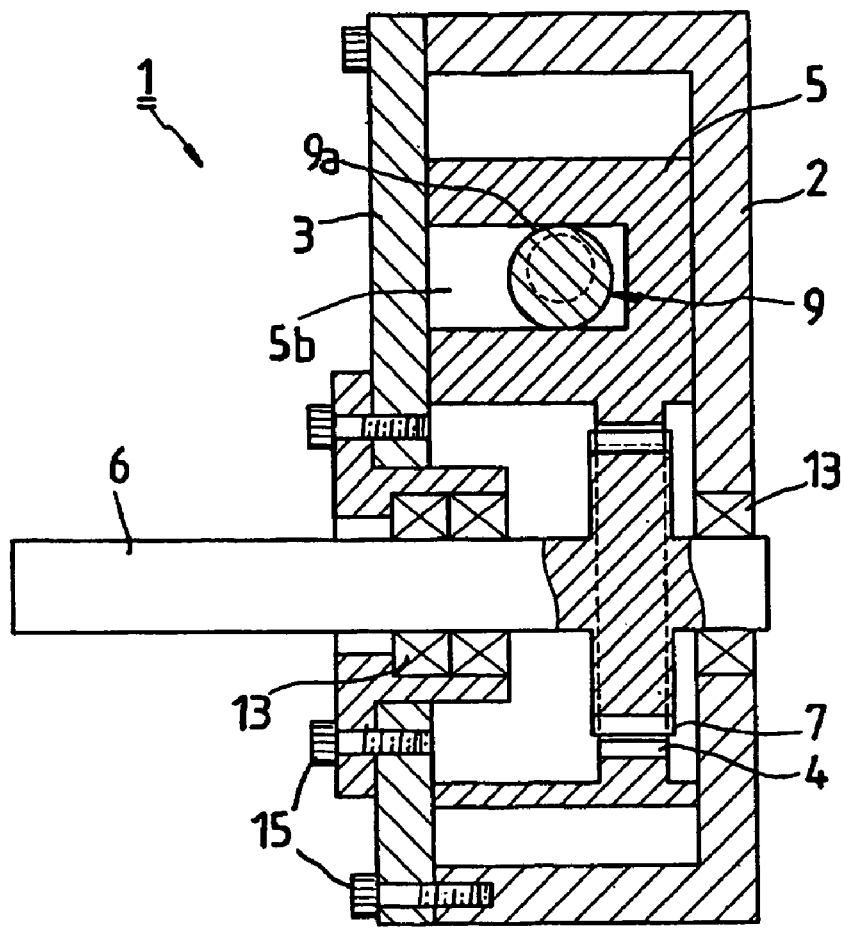
FIG. 4 is a sectional view showing a state where the eccentric shafts of the device are coupled.

FIG. 1 is a perspective view of a speed reduction device according to the present invention. FIG. 2 is an exploded perspective view of the speed reduction device. FIG. 3 is a front sectional view showing the coupled state of the speed reduction device. FIG. 4 is a sectional view showing a state where the eccentric shafts of the device are coupled.

In the configuration of a speed reduction device 1 according to the present invention, a generally square casing 2 that is closed by a cover 3 is provided at the inside thereof with a rotary plate 5 in which an internal gear 4 is formed, the internal gear 4 being in eccentrically tooth-coupling relation with an external gear 7 that is disposed on an output shaft 6 installed on the square casing 2 and the cover 3, whereby the speed reduction device 1 can output the rotational force reduced according to the tooth-coupling positions based upon the eccentric quantity produced during the rotation of the rotary plate 5.

The rotary plate 5 is provided at the outside thereof with operational grooves 5a and 5b at right and acute angles to the internal gear 4 and the output shaft 6, and the operational grooves 5a and 5b are coupled to the eccentric shafts 8 and 9 that are coupled to the square casing 2, thereby making it possible to correspond to the eccentric quantity generated between the internal gear 4 and the external gear 7. The eccentric shafts 8 and 9 are at the same time driven by bevel gears 10 and 11 that are respectively coupled on the end portions thereof, and any one of the two eccentric shafts is extended to the outside from the casing 2 so as to be employed as an input shaft 12 to which power is applied.

The eccentric shafts 8 and 9 are provided with eccentric parts 8a and 9a, at the time of being rotated in the respective operational grooves 5a and 5b, that are constructed in such a manner that when the eccentric part 8a of the eccentric shaft 8 pushes the rotary plate 5 to the output shaft 6 side or to the opposite side to the output shaft 6, the eccentric part 9a of the eccentric shaft 9 serves to guide the rotary plate 5.

The output shaft 6 and the eccentric shafts 8 and 9 each is of course supported by a bearing 13.

Figure 5:
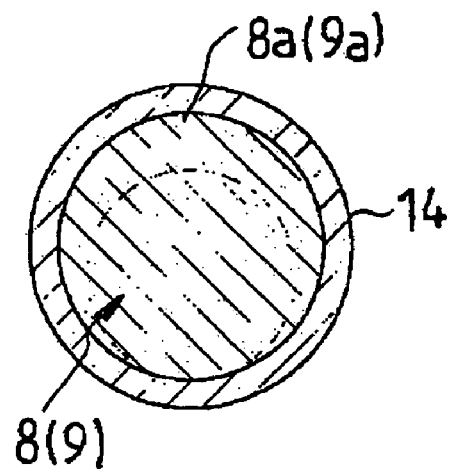
FIG. 5 is a sectional view showing a state where a bearing or bearing metal is coupled to the eccentric shafts of the device.

The eccentric shafts 8 and 9 may be, as shown in FIG. 5, coupled to a bearing or bearing metal 14 for the purpose of helping their operation as mentioned above to be carried out smoothly.

A reference numeral 15 that is not mentioned above represents a bolt for fixing to the cover 3.

The speed reduction device 1 with the configuration as depicted above is available in various industrial fields. That is to say, if the input shaft 12 is driven, the two eccentric shafts 8 and 9 that are engaged with the bevel gears 10 and 11 start to rotate, thereby allowing the rotary plate 5 to be rotated.

Now, an explanation of the operational order of the rotary plate 5 will be given, with reference to FIG. 3, as follows:

a) When the eccentric shaft 8 with the input shaft 12 is provided pushes the rotary plate 5 to the output shaft 6 side, the eccentric shaft 9 guides the rotary plate 5 to the left side;

b) When the eccentric shaft 9 pushes the rotary plate 5 to the opposite side to the output shaft 6, the eccentric shaft 8 guides the rotary plate 5 to the upper side;

c) When the eccentric shaft 8 with the input shaft 12 is provided pushes the rotary plate 5 to the opposite side to the output shaft 6, the eccentric shaft 9 guides the rotary plate 5 to the right side; and d) When the eccentric shaft 9 pushes the rotary plate 5 to the output shaft 6, the eccentric shaft 8 guides the rotary plate 5 to the lower side.

The rotary plate 5 has the four-stage operation repeatedly by the rotation force of the input shaft 12 and thus rotates such that with the turning force generated from the rotary plate 5, the internal gear 4 that is disposed in the inside of the rotary plate 5 and the external gear 7 on the output shaft 6 that is engaged with the internal gear 4 are rotated to thereby achieve a substantially high reduction ratio.

In other words, the speed reduction device according to the present invention is capable of achieving the high reduction ratio during the rotation of the rotary plate 5 by the operation of the eccentric shafts 8 and 9 and during the rotation of the external gear 7 on the output shaft 6 by the operation of the internal gear 4 in the rotary plate 5.

On the other hand, the speed reduction device has also a function of preventing a rotational back-rush. In more detail, the input shaft 12 stops during the input/output operation, and thus if the rotational back-rush occurs in the output shaft 6 side, the eccentric shafts 8 and 9 that are coupled to the operational grooves 5a and 5b formed at the right and acute angles to the rotary plate 5 serve to rigidly hold the rotary plate 5, thereby avoiding the generation of the rotational back-rush from the output shaft 6.

INDUSTRIAL APPLICABILITY

As set forth in the foregoing, there is provided the speed reduction device having a high reduction ratio that prevents a rotational back-rush, which is configured in such a simple way that the eccentric shafts 8 and 9 are disposed perpendicularly to each other at the outside of the rotary plate 5 with an internal gear 4 formed in the inside thereof and are in tooth-coupling relation with the bevel gears 10 and 11 on the end portions thereof, thereby making the rotary plate 5 turned by the eccentric force applied from the eccentric shafts, and that the internal gear 4 in the inside of the rotary plate 5 is coupled eccentrically to the external gear 7 on the output shaft 6. Thereby, the speed reduction device 1 of the present invention has some advantages that as the device is configured in a very simple manner, it achieves a substantially high reduction ratio at a substantially low expense, and it provides a function of preventing the rotational back-rush with reliability. Therefore, if the speed reduction device of the present invention is applied in various industrial fields, it ensures that it exhibits lots of excellent effects and benefits in the corresponding field.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A speed reduction device for preventing a rotational back-rush, said device comprising:

a rotary plate in which an internal gear is formed provided at the inside of a generally square casing, said square casing adapted to be closed by a cover;

an external gear disposed in eccentrically tooth-coupling relation with said internal gear, said external gear coupled on an output shaft that is installed on said square casing and said cover;

operational grooves disposed at right and acute angles to said internal gear and said output shaft, at the outside of said rotary plate;

eccentric shafts provided in said operational grooves to correspond to the eccentric quantity generated between said internal gear and said external gear, said eccentric shafts coupled to said square casing and at the same time driven by bevel gears coupled to end portions thereof;

an input shaft extended from any one of said eccentric shafts to the outside of said square casing, to which power transmission is made; and eccentric parts provided in said eccentric shafts, said eccentric parts, at the time of being rotated in the respective operational grooves, constructed in such a manner that when said eccentric part of said eccentric shaft pushes said rotary plate to said output shaft side or to the opposite side to said output shaft, said eccentric part of said eccentric shaft serves to guide said rotary plate.

2. The speed reduction device according to claim 1, wherein said eccentric shafts are respectively coupled to a bearing or bearing metal for the purpose of helping their operation be carried out smoothly.

* * * * *